Oct. 20, 1925.  1,557,715
P. H. McCAIN
NUT TAPPING MACHINE
Filed Dec. 14, 1922   3 Sheets-Sheet 2
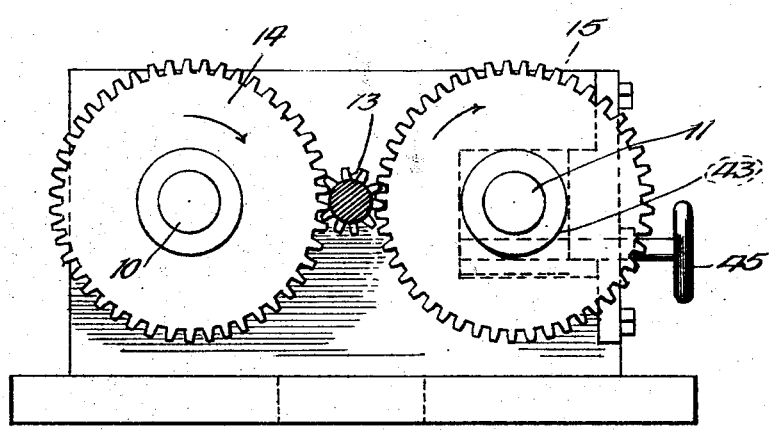
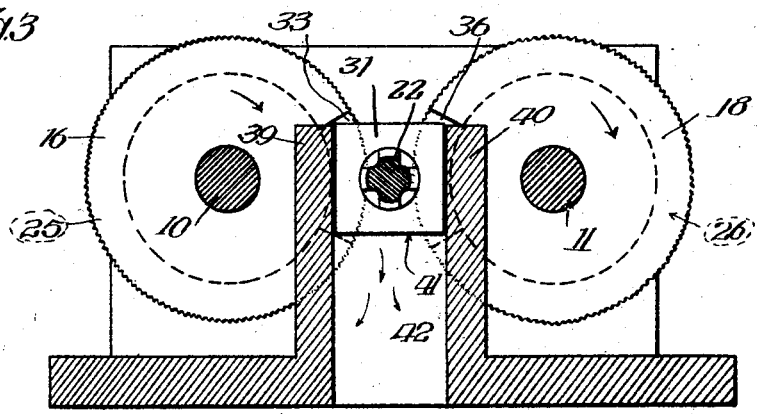
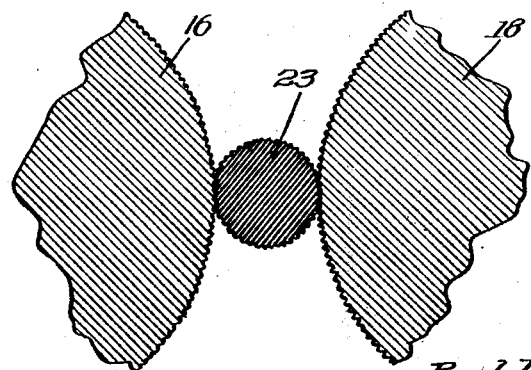
Inventor:—
Paul H. McCain
By
Attys Oct. 20, 1925.
P. H. McCAIN
NUT TAPPING MACHINE
Filed Dec. 14, 1922
1,557,715
3 Sheets-Sheet 3
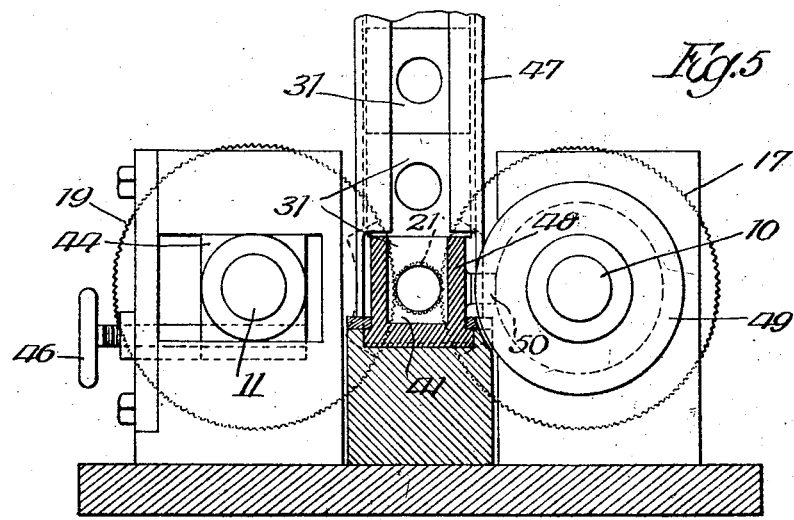
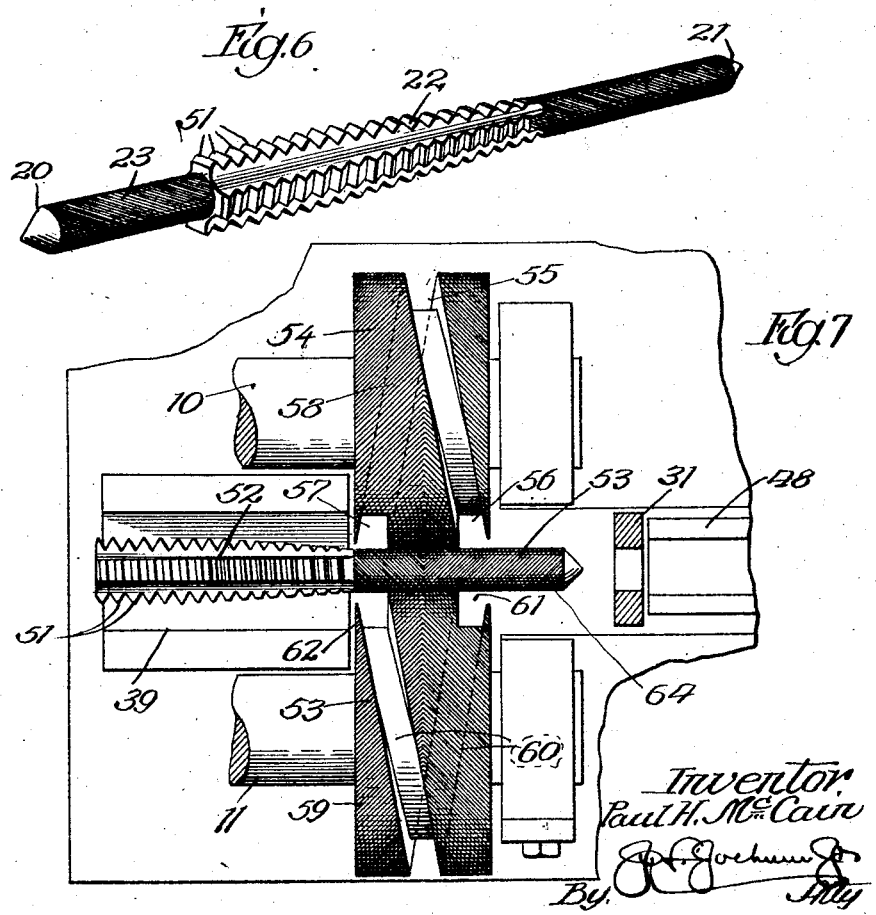
Inventor
Paul H. McCain Patented Oct. 20, 1925.

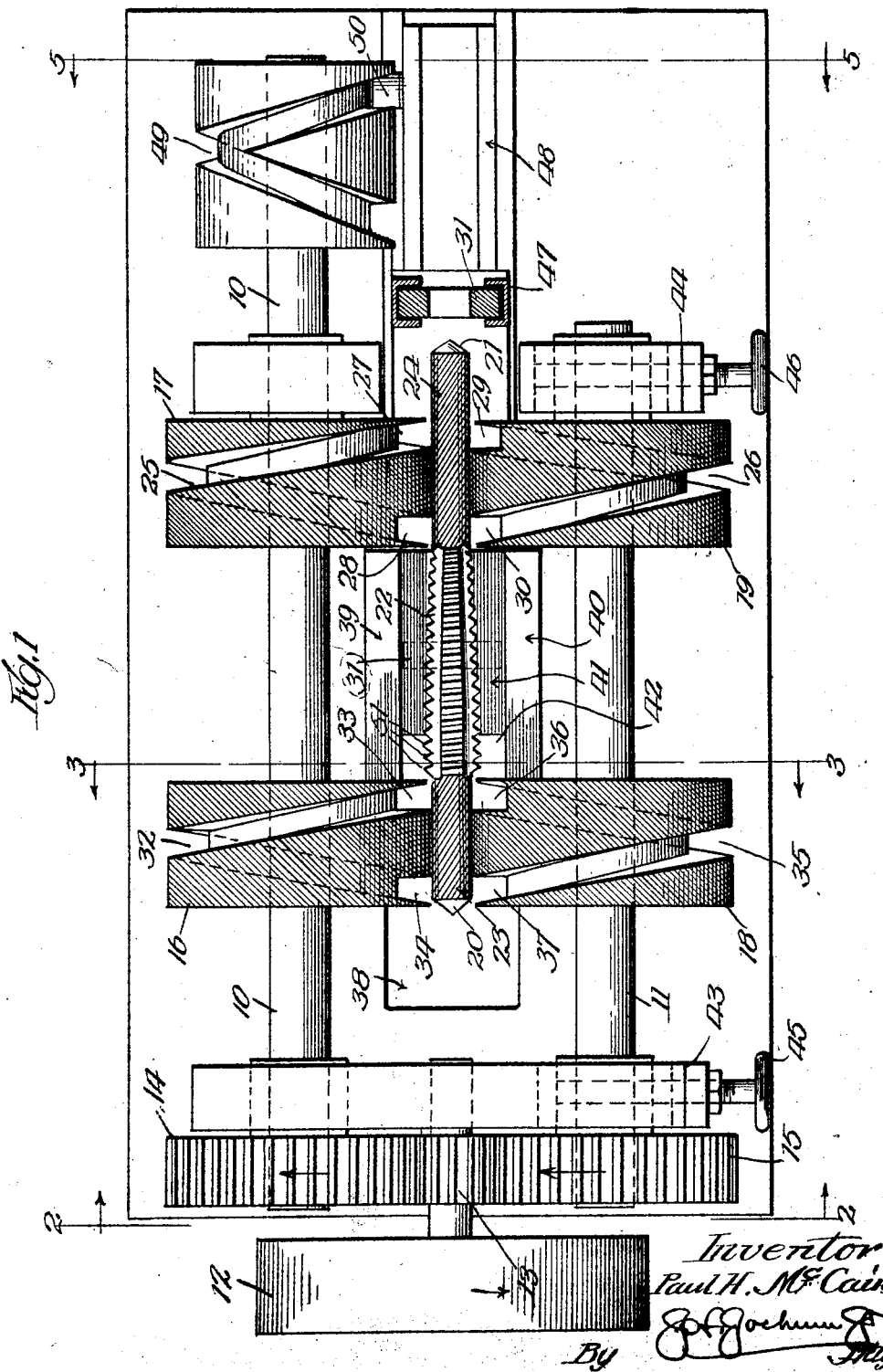

1,557,715

UNITED STATES PATENT OFFICE.

PAUL H. McCAIN, OF CHICAGO, ILLINOIS, ASSIGNOR TO ECONOMY SCREW CORPORATION, OF CHICAGO, ILLINOIS, A CORPORATION OF ILLINOIS.

NUT-TAPPING MACHINE.

Application filed December 14, 1922. Serial No. 606,780.

*To all whom it may concern:*

Be it known that I, PAUL H. McCAIN, a citizen of the United States, residing at Chicago, in the county of Cook and State of Illinois, have invented certain new and useful Improvements in Nut-Tapping Machines, of which the following is a specification.

This invention relates to improvements in nut tapping machines, and one of the objects of the invention is to provide an improved machine of this character in which there is employed a floating tap to which the nut blanks to be tapped are fed, and which tap is adapted to operate simultaneously upon a plurality of nuts, without danger of subjecting the tap to any undue strain.

A further object is to provide an improved machine of this character in which the floating tap is positively driven from both ends thereof.

A further object is to provide an improved machine of this character in which the tap driving or operating means also serves as a means for advancing or feeding the nut with respect to the tap.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which—

Figure 1 is a top plan view partly in section of a machine of this character constructed in accordance with the principles of this invention.

Figure 2 is a view taken on line 2—2, Figure 1.

Fig. 3 is a view taken on line 3—3, Figure 1.

Figure 4 is an enlarged detail view in vertical section of a portion of the tap and the driving mechanism therefor.

Figure 5 is a sectional view taken on line 5—5, Figure 1.

Figure 6 is a detail view of the tap.

Figure 7 is a view similar to Figure 1 of a modified form of the invention.

Referring more particularly to the drawings the numerals 10 and 11 designate shafts which are driven in any suitable manner and from any suitable source, preferably through the medium of a pulley 12, having connected therewith a gear 13, and which gear is disposed between and meshes with gears 14—15, secured respectively to the shafts 10 and 11, the gear 13 operating to drive the shafts 10 and 11 in the same direction and in the direction indicated by the arrows in Figure 1.

Secured to the shaft 10 for rotation therewith, are laterally spaced driving elements 16—17 and secured also to the shaft 11, for rotation therewith, and co-operating respectively with the driving elements 16 and 17, are similar driving elements 18 and 19. The peripheries of these elements 16, 17, 18 and 19 are undulated or knurled so as to provide serrations across the faces of the peripheries and which serrations or undulations are spirally arranged and may be of any desired depth and pitch.

The elements 16 and 17 are spaced from the elements 18 and 19 a sufficient distance to permit the insertion therebetween of the ends 20—21 of a tap 22. The ends of the tap beyond the cutting portion thereof may be of any desired length and the end 20 is provided with knurlings or serrations 23, while the end 21 is provided with similar knurlings or serrations 24.

The knurlings or serrations on the ends of the tap are arranged spirally thereabout and co-incide with the knurlings or serrations on the respective driving members between which the ends are located. The driving members serve as supports for the tap 22, so that the tap will be rotated and driven from both ends thereof, at the same time the knurlings or serrations on the ends of the tap co-operating with the knurlings or serrations on the respective driving members serve as a means for preventing a longitudinal movement of the tap. The respective members of the pairs of driving elements 16—18 and 17—19 engage the respective ends of the tap on opposite sides so that the tap will have no tendency to move from between the driving elements, the driving elements operating on opposite sides of the end of the tap serving to hold the tap in proper position.

The driving elements 16—17—18—19 may be of any desired diameter and the ends 20 and 21 of the tap may also be of any desired relative diameter so as to produce the desired ratio of operation between the driving elements and the tap.

The driving elements 17 and 19 are respectively provided with cam shaped grooves 25—26, opening through the respective peripheries thereof. The cam groove 25 opens through one face of the element 17 as at 27 and also through the opposite face of the element as at 28, while the groove 26 in the element 19 opens through one face as at 29 to cooperate with the opening 27 in the element 17 and the other end of the cam groove 26 opens through the opposite face of the element 19 as at 30, to co-operate with the opening 28 in the element 17, so that when the nut blank 31 is fed upon the end 21 of the tap, the blank will pass into the openings 27—29 to be caught by the grooves 25—26, which latter will advance the nut blank along the end 24 of the tap, until it is delivered through the openings 28—30 to be engaged by the cutting portion of the tap.

The element 16 is provided with a cam groove 32 opening through the periphery thereof and which also opens through one face of the element as at 33 and the opposite face as at 34. The element 18 is provided with a similar peripheral cam groove 35, which opens through one face as at 36, to co-operate with the opening 33 in the element 16 and opens through the opposite face as at 37 to co-operate with the opening 34 in the element 16, so that as the nut blank 31 passes from the cutting portion of the tap 22, it will be caught by the co-operating ends 33—36 of the grooves 32—35 to be fed along the end 23 of the tap and will be discharged from the end of the tap through the openings 34—37 to be delivered through a suitable opening or a chute 38, to be conveyed away from the machine.

During the time that the nut blank 31 is being operated upon by the cutting portion of the tap the blank may be held against rotation in any desired or suitable manner and for that purpose the blank may pass between suitable co-operating jaws or guides 39—40, the guides being preferably in the form of a trough 41, having a discharge opening 42 at one end thereof to permit the shavings from the nut blank to be discharged from the trough 41. This trough is adapted to receive lubrication from any suitable source and in any suitable manner.

The elements 18 and 19 and the shaft 11 are preferably mounted in adjustable bearings 43—44, adjustable in any suitable manner such as by means of adjusting screws 45—46, so as to permit the elements 18 and 19 to be moved away from the elements 16 and 17 when it is desired to remove the tap 22 or to replace the tap with a new one.

After the tap has been placed in position the elements 18 and 19 may again be adjusted and secured in position to hold the tap and operate the same.

It is thought that the operation of this machine will be clearly understood but briefly stated it is as follows. The nut blanks 31 may be positoned so that the opening in the blank will be in alinement with the end 21 of the tap in any desired or suitable manner preferably being fed from a suitable source of supply such as a hopper or the like (not shown) into a chute 47 to be arrested when its opening is in alinement with the end 21 of the tap.

A reciprocating and hollow plunger 48 is adapted to engage the blank and to feed the same upon the end 21 of the tap until the blank is caught by the cam grooves 25—26. The blank will then be fed along the end of the tap until it passes out of the co-operating openings 28—30 of the elements 17 and 19, at which time the blank is caught by the cutting mechanism of the tap and while it is between the jaws 39—40 and the operation of cutting the threads in the tap will also serve as a means for advancing the work. After the cutting operation the blank will be in a position to enter the co-operating openings 33—36 of the cam grooves 32—35 and will be advanced by the grooves to be discharged or delivered from the end 23 of the tap through the openings 34—37.

The plunger 48 may be reciprocated in any desired or suitable manner such as by means of a cam device 49, which may be connected with the shaft 10 and the plunger 48 may be provided with a projection 50 adapted to enter the cam grooves 49.

It will be manifest from this construction that there is not only provided a tap for cutting the threads in the nut blank and having its ends free for the passage of the nuts thereover, but the tap will also be positively operated from both ends thereof and at the same time the operating mechanism is so constructed and arranged that longitudinal movement of the tap will be prevented. Furthermore, the driving mechanism for the tap also serves as a means for advancing the work with respect to the tap.

If desired, the last series 51 of the teeth of the tap may be of a uniform diameter so as to maintain the size of the threads after the cutting operation and so as to serve as an additional means for advancing the finished nut to present it to the removing means.

In the form of the invention shown in Figure 7, the tap 52 is supported and driven from one end 53 and in this form of the invention the element 54 is provided with a cam groove 55, having an opening 56 through one face and an opening 57 through the other face, the knurls, corrugations, or serrations 58 on the periphery of the element 54 being, however, of the herring bone type. The element 59 is also provided with a cam groove 60 opening through one face as at 61 and through the opposite face as at 62, while the corrugations, serrations or knurls 63 on the periphery of the element 59 are also of the herring bone type, the corrugations, serrations or knurls 64 on the end 53 of the tap 52 being arranged to correspond and co-operate with the knurlings on the elements 54 and 59.

These corrugations, knurls or serrations on the elements 54 and 59 will operate not only to rotate the tap 52 but will also serve as a means for preventing longitudinal shifting movement of the tap.

While the preferred forms of the invention have been herein shown and described it is to be understood that various changes may be made in the details of construction and in the combination and arrangement of the several parts, and therefore it is desired that the drawings herewith submitted shall be considered as being merely diagrammatic.

What is claimed as new is:—

1. A nut tapping machine embodying a rotatable tapping element, and means for driving the tap from both ends thereof, the said means including driving elements adjacent and having constant engagement with both ends of the tap.

2. A nut tapping machine embodying a rotatable tapping element, and means for rotating the tap from both ends thereof, said means including driving elements adjacent and having constant engagement with the peripheries of the ends of the tap remote from the extremities of said ends, the said elements operating to maintain the tap against longitudinal movement.

3. A nut tapping machine embodying a tapping element, and means for rotating the tapping element, the said means including formations directly engaging the work to feed the work lengthwise of the tap.

4. A nut tapping machine embodying a tapping element, and means for rotating the tapping element, the said means including formations directly engaging the work to feed the work lengthwise of the tap and while the tap rotating means remains operatively engaged with the tap.

5. A nut tapping machine embodying a tap, and means engaging both ends of the tap for rotating it, the said means including formations directly engaging the work to feed the work lengthwise upon the tap and while the said rotating means operatively engage the ends of the tap.

6. A nut tapping machine embodying a tapping element, driving means operatively engaging one end of the tap for rotating it, and means whereby the work will be fed upon the end of the tap and advanced along said end by said driving means and while the said driving means is in operative engagement with the said end.

7. A nut tapping machine embodying a tapping element, means operatively engaging one end of the tap for rotating it, and means for feeding the work to the tap over the said end and while the said driving means is in operative engagement with said end.

8. A nut tapping machine embodying a tapping element, and means operatively engaging one end of the tap for rotating it, a portion of the said rotating means serving to advance the work upon and in a direction lengthwise of the tap.

9. A nut tapping machine embodying a tapping element, driving means operatively engaging one end of the element for rotating it, means for presenting the work to the tap, and means for feeding the nut lengthwise of the tap and through the said driving means.

10. A nut tapping machine embodying a tapping element, and driving means operatively engaging one end of the said element for rotating it, a portion of the said driving means being shaped to form a cam surface for feeding the work lengthwise of the tap.

11. A nut tapping machine embodying a pair of driving elements rotating about parallel axes, and a tapping element, one end of the said element projecting between the adjacent portions of the peripheries of said driving elements, the peripheries of the driving elements being undulated and the portion of the tap engaged by said peripheries being correspondingly undulated and co-operating therewith.

12. A nut tapping machine embodying a pair of driving elements rotatable about parallel axes and having the same direction of rotation, and a tapping element, one end of the said element projecting between the adjacent portions of the peripheries of said driving elements, the peripheries of the driving elements being undulated and the portion of the tap engaged by said peripheries being correspondingly undulated and co-operating therewith.

13. A nut tapping machine embodying a pair of driving elements disposed in close proximity and rotatable about parallel axes and having the same direction of rotation, and a tapping element, a portion of the tap projecting between and being engaged on opposite sides by the said driving elements, the peripheries of said driving elements being provided with serrations and the periphery of the portion of said tap that projects between said driving elements being correspondingly serrated whereby the said tap will be rotated and the serrations will co-operate to maintain the tap against longitudinal movement.

14. A nut tapping machine embodying a pair of driving elements disposed in close proximity and rotatable about parallel axes and having the same direction of rotation, and a tapping element, a portion of the tap projecting between and being engaged on opposite sides by the said driving elements, the peripheries of said driving elements being provided with serrations and the periphery of the portion of said tap that projects between said driving elements being correspondingly serrated whereby the said tap will be rotated and the serrations will co-operate to maintain the tap against longitudinal movement, portions of the peripheries of the said driving elements being shaped to form co-operating cam grooves for advancing the work upon the end of and lengthwise of the tap.

15. A nut tapping machine embodying a pair of driving elements disposed in close proximity and rotatable about parallel axes and having the same direction of rotation, and a tapping element, a portion of the tap projecting between and being engaged on opposite sides by the said driving elements, the peripheries of said driving elements being provided with serrations and the periphery of the portion of said tap that projects between said driving elements being correspondingly serrated whereby the said tap will be rotated and the serrations will co-operate to maintain the tap against longitudinal movement, a portion of the periphery of one of the said driving elements being shaped to form a cam groove for advancing the work upon the end of and lengthwise of the tap.

16. A nut tapping machine embodying two pairs of co-operating and laterally spaced rotatable driving elements, and a rotatable tap, the ends of the taps projecting between the respective co-operating driving elements of the said pairs of driving elements and being supported entirely by said driving elements, the peripheries of the said driving elements having spirally arranged serrations and the periphery of the ends of the tap being also provided with spirally arranged serrations co-operating with the serrations on the respective driving members whereby the tap will be rotated.

17. A nut tapping machine embodying two pairs of co-operating and laterally spaced rotatable driving elements, a rotatable tap, the ends of the taps projecting between the respective co-operating driving elements of the said pairs of driving elements and being supported entirely by said driving elements, the peripheries of the said driving elements having spirally arranged serrations and the periphery of the ends of the tap being also provided with spirally arranged serrations co-opetcive with the serrations on the respetcive driving members whereby the tap will be rotated, means whereby one set of driving elements will feed the work on to one end of the tap, and means whereby the other set of driving elements will feed the work off of the other end of the tap.

18. A nut tapping machine embodying two pairs of co-operating and laterally spaced rotatable driving elements, and a rotatable tap, the ends of the taps projecting between the respective co-operating driving elements of the said pairs of driving elements and being supported entirely by said driving elements, the peripheries of the said driving elements having spirally arranged serrations and the periphery of the ends of the tap being also provided with spirally arranged serrations co-operating with the serrations on the respective driving member whereby the tap will be rotated, the said serrations co-operating for maintaining the tap against longitudinal movement.

19. A nut tapping machine embodying a rotatable tap, means operating upon both ends of the tap for rotating it, means for feeding the work upon one end of the tap and while the driving mechanism at said end remains in operative engagement with such end, and means other than the tap for removing the work from the opposite end of the tap and while the driving mechanism of the last recited end remains in operative engagement therewith.

20. A nut tapping machine embodying a rotatable tap, means operating upon both ends of the tap for rotating it, means for feeding the work upon one end of the tap and while the driving mechanism at said end remains in operative engagement with such end, means other than the tap for removing the work from the opposite end of the tap and while the driving mechanism of the last recited end remains in operative engagement therewith, and means for maintaining the work against rotation during the tapping operation.

21. A nut tapping machine embodying a rotatable tap, means operating upon both ends of the tap for rotating it, means for feeding the work upon one end of the tap and while the driving mechanism at said end remains in operative engagement with such end, and means other than the tap for removing the work from the opposite end of the tap and while the driving mechanism of the last recited end remains in operative engagement therewith, the second and third recited means embodying cam grooves in the first recited means for receiving and advancing the work with relation to the tap.

22. A nut tapping machine including a tap supported so that the ends thereof will be free to permit the passage of the nut thereover, and means for rotating the tap, the said means having formations directly engaging the nut and operating to move the nut in a direction lengthwise of the tap.

23. A nut tapping machine including a tap, and means engaging the tap adjacent the end thereof for rotating it, the said means having formations directly engaging the nut for moving the latter upon the tap from one side of the rotating means to the other side thereof and while the said rotating means moves in operative engagement with the tap.

24. A nut tapping machine including a tap supported so that the ends thereof will be free, and driving means constantly engaging the tap adjacent one end thereof, the nut being movable lengthwise of the tap and over the last recited end thereof while the driving means is in active engagement with the last said end.

25. A nut tapping machine including a tap supported so that the ends thereof will be free, and driving means constantly engaging the tap adjacent both ends thereof, the nut being movable lengthwise of the tap and over each end thereof and while the driving means adjacent the respective ends of the tap is in operative engagement with the tap.

26. A nut tapping machine including a tap supported so that the ends thereof will be free, and driving means constantly engaging the tap adjacent one end thereof, the nut being movable lengthwise of the tap and over the last recited end thereof, while the driving means is in active engagement with the last said end, the said driving means operating to advance the nut upon the tap in a direction lengthwise of the axis of the tap.

27. A nut tapping machine including a tap supported so that the ends thereof will be free, and driving means constantly engaging the tap adjacent both ends thereof, the nut being movable lengthwise of the tap and over each end thereof and while the driving means adjacent the respective ends of the tap is in operative engagement with the tap, the driving means adjacent each end of the tap operating to advance the nut upon the tap in a direction lengthwise of the axis of the tap.

In testimony whereof I have signed my name to this specification on this 20th day of November, A. D. 1922.

PAUL H. McCAIN.